United States Patent [19]
Young et al.

[11] Patent Number: 5,782,596
[45] Date of Patent: *Jul. 21, 1998

[54] TOW TRUCK EQUIPPED WITH A LIGHT WEIGHT RUST RESISTANT BODY ASSEMBLY AND AN UNDERLIFT ASSEMBLY

[75] Inventors: Charles E. Young, Falling Waters, W. Va.; James J. Bartel, Southfield, Mich.

[73] Assignee: Jer-Dan Corporation, Greencastle, Pa.

[*] Notice: This patent issued on a continued prosecution application filed under 37 CFR 1.53(d), and is subject to the twenty year patent term provisions of 35 U.S.C. 154(a)(2).

[21] Appl. No.: 555,032

[22] Filed: Nov. 8, 1995

[51] Int. Cl.$^6$ .................................................. B60P 3/12
[52] U.S. Cl. .................. 414/563; 280/402; 414/546; 414/428; 296/183
[58] Field of Search .................... 414/428, 563, 414/546; 296/37.6, 183; 280/402; 254/20, 2 B, 2 R

[56] References Cited

U.S. PATENT DOCUMENTS

| 2,183,478 | 12/1939 | Holmes et al. | 212/141 |
|---|---|---|---|
| 2,436,000 | 2/1948 | Fleming. | |
| 2,449,146 | 9/1948 | Ryan. | |
| 2,495,493 | 1/1950 | Wright | 280/32.44 |
| 2,625,278 | 1/1953 | Sensenbaugh. | |
| 2,793,770 | 5/1957 | St. Denis. | |
| 3,434,607 | 3/1969 | Nelson. | |
| 3,667,630 | 6/1972 | Scott. | |
| 3,667,631 | 6/1972 | Bishop. | |
| 3,951,280 | 4/1976 | Peck. | |
| 4,186,938 | 2/1980 | Youngblood | 280/402 |
| 4,194,755 | 3/1980 | Youngblood | 280/402 |
| 4,384,817 | 5/1983 | Peterson | 414/563 |

(List continued on next page.)

FOREIGN PATENT DOCUMENTS

| 2690883 | 11/1993 | France | 414/563 |
|---|---|---|---|
| 251253 | 11/1987 | Japan | 414/563 |
| 2239232 | 6/1991 | United Kingdom | 280/402 |
| 2238290 | 5/1995 | United Kingdom | B60P 3/12 |

OTHER PUBLICATIONS

Copy of Vulcan 30.25 – pp. 1–4 – copy in 414/563 – dated Apr. 19, 1990.

Abstract of Canadian Patent No. 2069809–A, Issued May 28, 1992, "Wheel Engaging System for Towing Vehicle Wheel Lifts", Derwent Publications Ltd. London, England 1993.

"Modified Acrylic Structural Adhesives", *Vesilok*, Lord Industrial Adhesives, Erie, Pennsylvania (Nov. 11, 1990).

*Primary Examiner*—Frank E. Werner
*Attorney, Agent, or Firm*—McDermott, Will & Emery

[57] ABSTRACT

A tow truck is disclosed equiped with an improved body assembly, underlift assembly and lifting boom assembly. The body assembly includes a left body unit and a right body unit. Each body unit has a structural unit and a plurality of exterior panhed to the structural unit. The structural unit is preferably formed from flanged aluminum panels that are attached by adhesive. The improved underlift assembly comprises a support arm coupled to the vehicle. A base is coupled to an end of the support arm, a boom base is pivotally attached to the base at a first pivot point and a boom is pivotally attached to the boom base at a second pivot point. A first actuator is coupled to the support arm and the boom base. The operation of the first actuator pivots the boom base with respect to the support arm. A second actuator is coupled to the boom base and the boom. The operation of the second actuator pivots the boom with respect to the boom base. The first actuator is used to position the boom during lifting operation, and the second actuator is used to position the boom into a folded rest position. The improved lifting boom includes two lifting hydraulic actuators that are coupled to the lifting boom on each side and angled inward to provide improved stability.

25 Claims, 18 Drawing Sheets

U.S. PATENT DOCUMENTS

| | | | |
|---|---|---|---|
| 4,451,193 | 5/1984 | Cannon, Jr. et al. | 414/563 |
| 4,473,334 | 9/1984 | Brown | 414/563 |
| 4,487,544 | 12/1984 | Hubbard | 414/563 |
| 4,564,207 | 1/1986 | Russ et al. | 280/402 |
| 4,573,857 | 3/1986 | Porter, Sr. et al. | 414/563 |
| 4,632,629 | 12/1986 | Kooima | 414/563 |
| 4,634,337 | 1/1987 | Hamman | 414/563 |
| 4,640,660 | 2/1987 | Watson | 414/563 |
| 4,674,943 | 6/1987 | Nespor | 414/563 |
| 4,678,392 | 7/1987 | Capers et al. | 414/563 |
| 4,679,978 | 7/1987 | Holmes et al. | 414/563 |
| 4,700,852 | 10/1987 | Mjöberg | 414/563 X |
| 4,701,099 | 10/1987 | Müller | 414/563 |
| 4,737,066 | 4/1988 | Allison, Jr. | 414/563 |
| 4,741,661 | 5/1988 | Carey | 414/563 |
| 4,761,110 | 8/1988 | Boutilier | 414/563 |
| 4,761,111 | 8/1988 | Brown | 414/563 |
| 4,775,285 | 10/1988 | Zackovich | 414/563 |
| 4,793,763 | 12/1988 | Bubik | 414/563 |
| 4,797,057 | 1/1989 | Shoup et al. | 414/563 |
| 4,797,058 | 1/1989 | Bilas | 414/563 |
| 4,798,509 | 1/1989 | Bubik | 414/563 |
| 4,815,915 | 3/1989 | Crupi, Jr. | 414/563 |
| 4,836,737 | 6/1989 | Holmes et al. | 414/563 |
| 4,838,753 | 6/1989 | Gehman et al. | 414/563 |
| 4,859,134 | 8/1989 | Lock | 414/563 |
| 4,861,221 | 8/1989 | Krisa | 414/563 |
| 4,871,291 | 10/1989 | Moore et al. | 414/563 |
| 4,874,285 | 10/1989 | Bubik | 414/563 |
| 4,927,315 | 5/1990 | Nespor | 414/563 |
| 4,946,182 | 8/1990 | Weber | 280/402 |
| 4,948,327 | 8/1990 | Crupi, Jr. | 414/563 |
| 4,974,900 | 12/1990 | Destefani et al. | 296/187 |
| 5,013,205 | 5/1991 | Schardt | 414/429 |
| 5,013,209 | 5/1991 | DeMichele | 414/563 |
| 5,236,214 | 8/1993 | Taylor | 414/563 X |
| 5,249,909 | 10/1993 | Roberts et al. | 414/476 |
| 5,259,572 | 11/1993 | Franken et al. | 244/50 |
| 5,267,773 | 12/1993 | Kalis, Jr. et al. | 296/183 |
| 5,269,553 | 12/1993 | Alonso | 280/402 |
| 5,302,074 | 4/1994 | Elfström | 414/427 |
| 5,326,216 | 7/1994 | Russ | 414/563 |
| 5,336,037 | 8/1994 | Cürten et al. | 414/429 |
| 5,350,271 | 9/1994 | Weller | 414/563 |

TOW TRUCK EQUIPPED WITH A LIGHT WEIGHT RUST RESISTANT BODY ASSEMBLY AND AN UNDERLIFT ASSEMBLY

BACKGROUND OF THE INVENTION

The present invention relates to tow trucks, for towing a disabled vehicle, and more particularly to a tow truck equipped with an improved light weight rust resistant body assembly, an improved underlift assembly which engages and lifts the frame or wheels of a vehicle, and an improved lifting boom assembly.

Trucks with body assemblies attached to their chassis have long been used. The body assemblies typically have storage compartments for tools and supplies. An example of a truck with an attached body assembly that is typical of the prior art is U.S. Pat. No. 5,267,773 to Kalis, Jr. et al. (Kalis). Kalis shows a body assembly that is formed from metal panels that are welded together and then bolted to the truck chassis.

The body assemblies of the prior art, such as painted steel, suffer from a propensity to rust caused by the exposure of the metal panels to the elements particularly when used in colder climates and salt water climates. Body assemblies with welded metal panel construction have restricted styling design options and affecting repairs is difficult. Another drawback of the prior art is the need to have body assemblies that are unique to each truck chassis construction type, requiring the manufacturer and dealer to carry large inventories.

None of the prior art body assembly approaches provide the advantages of providing a panel assembly for attachment to a truck chassis that is light weight and resistant to rust and other deterioration due to exposure to the elements as well as, providing a body assembly that can be adapted to multiple truck chassis construction types, along with improved styling options and simplified repair.

Tow trucks, for towing disabled vehicles by lifting either the front or rear wheels off the ground, and towing the partially-lifted automobile on its remaining two wheels, have long been used. The more modern and readily used types of tow trucks are known as "wheel-lift" tow trucks. A wheel lift tow truck engages and lifts the vehicle to be towed at either its front or rear wheels (tires).

Wheel-lift tow trucks generally employ a telescoping or folding main boom element attached to a lifting boom, that is coupled to the tow truck chassis, and extending rearwardly from or out beyond the truck's rear deck (the space between the rear of the cab and the rear bumper). The boom or crane element represents the main lifting or leverage component for lifting one end of the vehicle to be towed. Such tow trucks also utilize a wheel engaging apparatus, hereinafter referred to as the wheel grid, for engaging and holding the front or rear wheels of a vehicle. When positioning the system for towing, the boom is maneuvered into a position against the tread of the tires and the wheel grid is locked into a position securing the tires in place against the boom. Examples of such a wheel-lift tow truck include: Youngblood, U.S. Pat. Nos. 4,186,938 and 4,194,755; LoCodo, U.S. Pat. No. 4,264,262; Lind, U.S. Pat. No. 4,473,237; Brown, U.S. Pat. No. 4,473,334; Russ, U.S. Pat. No. 4,564,207; Capers et al., U.S. Pat. No. 4,678,392; Muller, U.S. Pat. No. 4,701,099; Carey, U.S. Pat. No. 4,741,661; Brown, U.S. Pat. No. 4,761,111; Shoup et al., U.S. Pat. No. 4,797,057; Nespor, U.S. Pat. No. 4,927,315; Schardt, U.S. Pat. No. 5,013,205; DeMichele et al., U.S. Pat. No. 5,013,209; Franken et al., U.S. Pat. No. 5,259,572; Elfstrom, U.S. Pat. No. 5,302,074; Russ, U.S. Pat. No. 5,326,216; Curten, U.S. Pat. No. 5,336,037, Weller, U.S. Pat. No. 5,350,271; Wern, Canadian Pat. No. CA 2069809-A; and Jones, UK Pat. App. GB 2 238 290 A.

Typically in the prior art, the boom is stored in an upright folded position. As exemplified by Cullum et al., U.S. Pat. No. 5,284,415, the lifting operation and the folding of the boom is performed with a single hydraulic actuator. The use of a single hydraulic actuator for both functions results in reduced ground clearance when in use and in storage and a lack of power in the lifting operation. The hydraulic actuator extends down towards the ground as it lifts the boom and therefore ground clearance is reduced by a hydraulic actuator that requires a long extension to perform both the lifting operation and folding function.

None of the patents described above provides the important advantages of, providing an underlift assembly for tow trucks having increased ground clearance and increased lifting ability. The present invention relates to a body assembly for attachment to a truck chassis, and more particularly to a body assembly for attachment to a tow truck chassis.

Typically in the prior art, the lifting boom is raised and lowered using two lifting hydraulic actuators. One lifting hydraulic actuator is disposed on each side of the lifting boom and coupled to the lifting boom and the truck chassis. Each of the two lifting hydraulic actuators are normally disposed so that the connection point to the lifting boom and the connection point to the truck chassis are the same distance from the vertical plane that goes through the length-wise center line of the lifting boom. The lines generated through the center of the lifting hydraulic actuators are parallel to the vertical plane that goes through the length-wise center line of the lifting boom. The lifting hydraulic actuators of the prior art thus travel through their range of motions in vertical planes that are parallel to the vertical plane that goes through the length-wise center line of the lifting boom. The lifting booms of the prior art suffer from a lack of stability caused by the placement of the lifting hydraulic actuators so that their ranges of motion occur in parallel vertical planes.

None of the prior art lifting booms provide the advantages of improved stability through the use of improved lifting hydraulic actuator placement.

SUMMARY OF THE INVENTION

According to the invention, a tow truck is provided with an improved rust resistant light weight rust resistant body assembly and an improved underlift assembly having improved ground clearance and improved lifting ability. The improved body assembly comprises, a body unit, such as a left body unit and a right body unit. Each of the body units comprise a structural unit, and at least one exterior panel attached to the structural unit. The structural unit is constructed from a plurality of panels having flanges formed on at least one edge. In a preferred embodiment the panels are formed from aluminum. The structural unit includes a front panel and a back panel that are attached on opposite ends of a plurality of compartment panels. A top panel is attached to the top of the front panel, the back panel and the plurality of compartment panels, subassembly. The front panel, back panel, top panel and compartment panels are attached by adhesive disposed on the flanges. The panels form a structural unit defining a plurality of storage compartments.

A plurality of exterior panels are attached to exterior surfaces of the structural unit. In a preferred embodiment the exterior panels are molded composite panels. An exterior panel top is attached to the top panel. An exterior front panel is attached to the front panel, and an exterior rear panel taillight assembly is attached to a rear surface of the structural unit. The exterior composite panels are light weight and resistant to deterioration from exposure to the elements. The exterior composite panels protect the metal structural unit from exposure to the elements. The molded composite panels have improved styling capabilities over metal panels. In a preferred embodiment the molded composite panels are removably attached in order to allow for panel replacement in case of damage.

The body unit has a plurality of storage compartments with doors providing access thereto. In a preferred embodiment the doors are formed from molded composite panels.

In a preferred embodiment the front and rear panels of the structural unit are each provided with two wheel well cutouts. The structural unit can then be used for either single axle or tandem axle truck chassis. The front exterior panel is provided with either one wheel well cutout or two depending upon whether the truck chassis is single axle or tandem. If the truck chassis has a single axle the front exterior panel has one wheel well cut-out that corresponds to the single axle and covers the unused wheel well cut-out of the front panel. Further additional modular storage units can be disposed adjacent to a forward surface of the structural unit, increasing the length of the body assembly. This allows for a single construction type of structural unit to be used for single and tandem axle truck chassis with multiple chassis lengths cutting down on inventory required by the manufacturer and distributors.

The improved body assembly of the present invention preserves the advantages of a body assembly for attachment to a tow truck having a plurality of storage compartments. In addition, it provides great new advantages not found in currently available body assemblies and overcomes many of the disadvantages associated with the known body assemblies.

As pointed out in greater detail below, the improved body assembly of the present invention provides a body assembly that is light weight, resistant to rust and deterioration caused by exposure to the elements and adaptable to a variety of truck chassis types and sizes, with replaceable panels for simplified repair.

The improved underlift assembly of the present invention comprises a support arm coupled to the tow truck having a truck chassis with a bed frame made up of spaced frame members, and a deck assembly situated upon the bed frame. A base is coupled by a first end to an end of the support arm. A boom base is pivotally attached to the base at a first pivot point and a boom is pivotally attached to the boom base at a second pivot point. A first actuator is coupled to the support arm and the boom base. The operation of the first actuator pivots the boom base with respect to the support arm. A second actuator is coupled to the boom base and the boom. The operation of the second actuator pivots the boom with respect to the boom base.

In a preferred embodiment the first pivot point is located adjacent to a second end of the base that is opposite to the first end of base, and adjacent to a first end of the boom base. The boom base has a second end that is located nearer to the first end of the base than is the first end of the boom base. The second pivot point is located further from the first end of the boom base than the first pivot point.

As pointed out in greater detail below, the underlift assembly of the present invention provides an underlift assembly that uses a first actuator to perform the lifting operation with a minimum extension required by the first actuator. The first actuator provides maximum ground clearance and power due to its reduced extension. A second actuator is used to perform the folding function.

The improved underlift assembly of the present invention has increased ground clearance because the first actuator which is directed towards the ground has a shorter range of extension than the main actuators of the prior art. The second actuator which is not directed towards the ground provides the additional extension needed to perform the folding function. The present invention may be adapted for use with underlift towing equipment of various types and sizes, including light and heavy duty equipment and both wheel and frame-lift systems.

The improved lifting boom assembly of the present invention comprises a first lifting hydraulic actuator disposed on a first side of the lifting boom and a second lifting hydraulic actuator disposed on a second side of the lifting boom. Each of the first and second lifting hydraulic actuators are coupled to the lifting boom and the tow truck chassis. The coupling points, of the first and second lifting hydraulic actuators to the tow truck chassis, are disposed a greater distance from a center vertical plane, that is formed through a length-wise center line of the lifting boom, than are the coupling points of the first and second lifting hydraulic actuators to the lifting boom. The first an second lifting hydraulic actuators are each coupled to the lifting boom and the tow truck chassis so that a line generated through the length-wise center of the lifting hydraulic actuator is not parallel with a vertical plane formed through a length-wise center line of the lifting boom.

The improved lifting boom assembly provides improved stability because the lifting hydraulic actuators are angled inward towards the lifting boom at their upper ends. The force vectors of each of the first and second lifting hydraulic actuators, as a result of the angled placement has a vertical component that provides the lift and a horizontal component that opposes the opposite lifting hydraulic actuator restricting the lifting boom from having any unwanted horizontal movement.

The invention itself, together with further objects and attendant advantages, will best be understood by reference to the following detailed description, taken in conjunction with the accompanying drawings.

DESCRIPTION OF THE PREFERRED EMBODIMENTS

Figure 1:
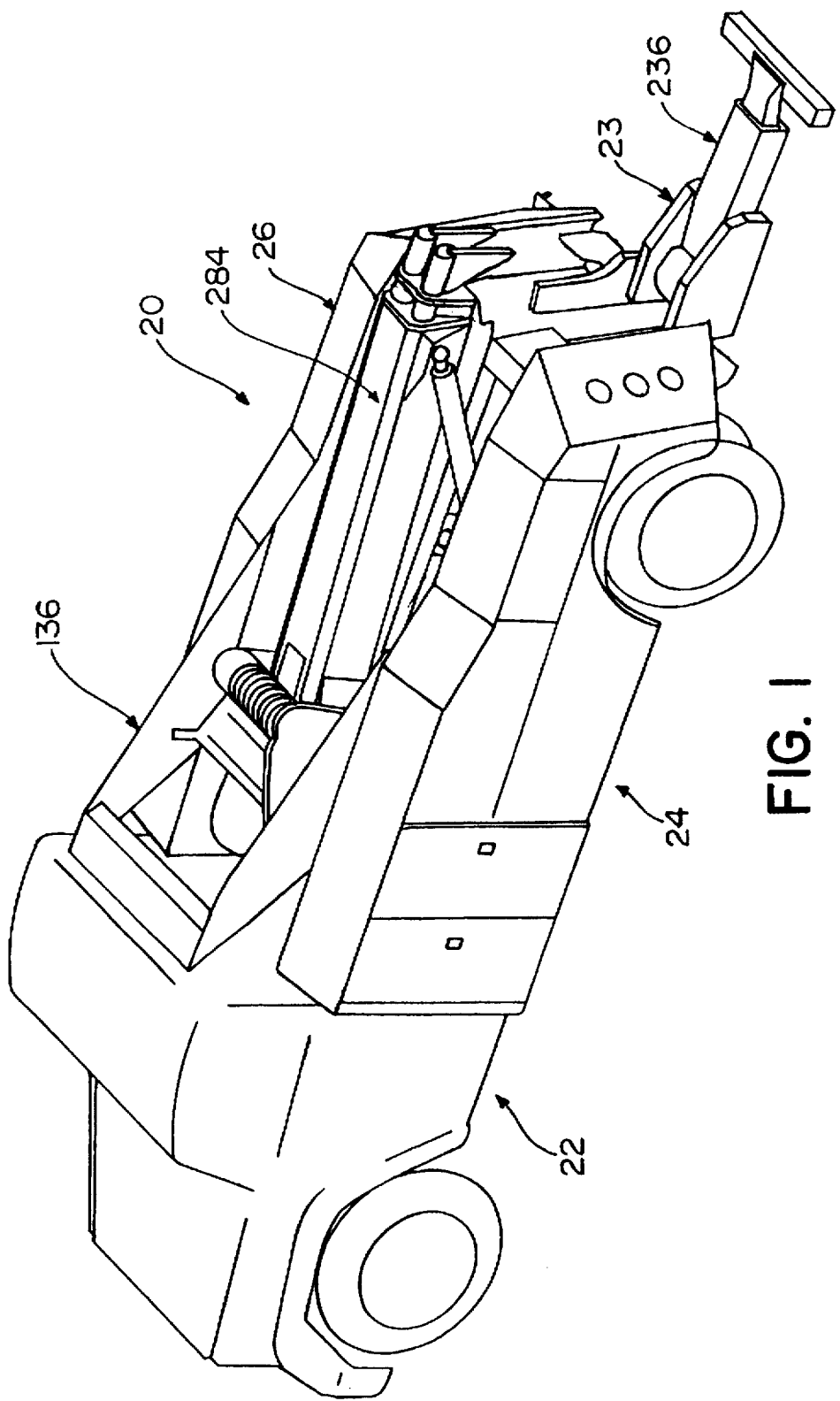
FIG. 1 is an isometric view of the tow truck equipped with the light weight rust resistant body assembly, the improved underlift assembly and the angled recovery boom cylinders of the present invention mounted on a tow truck chassis.
Figure 2:
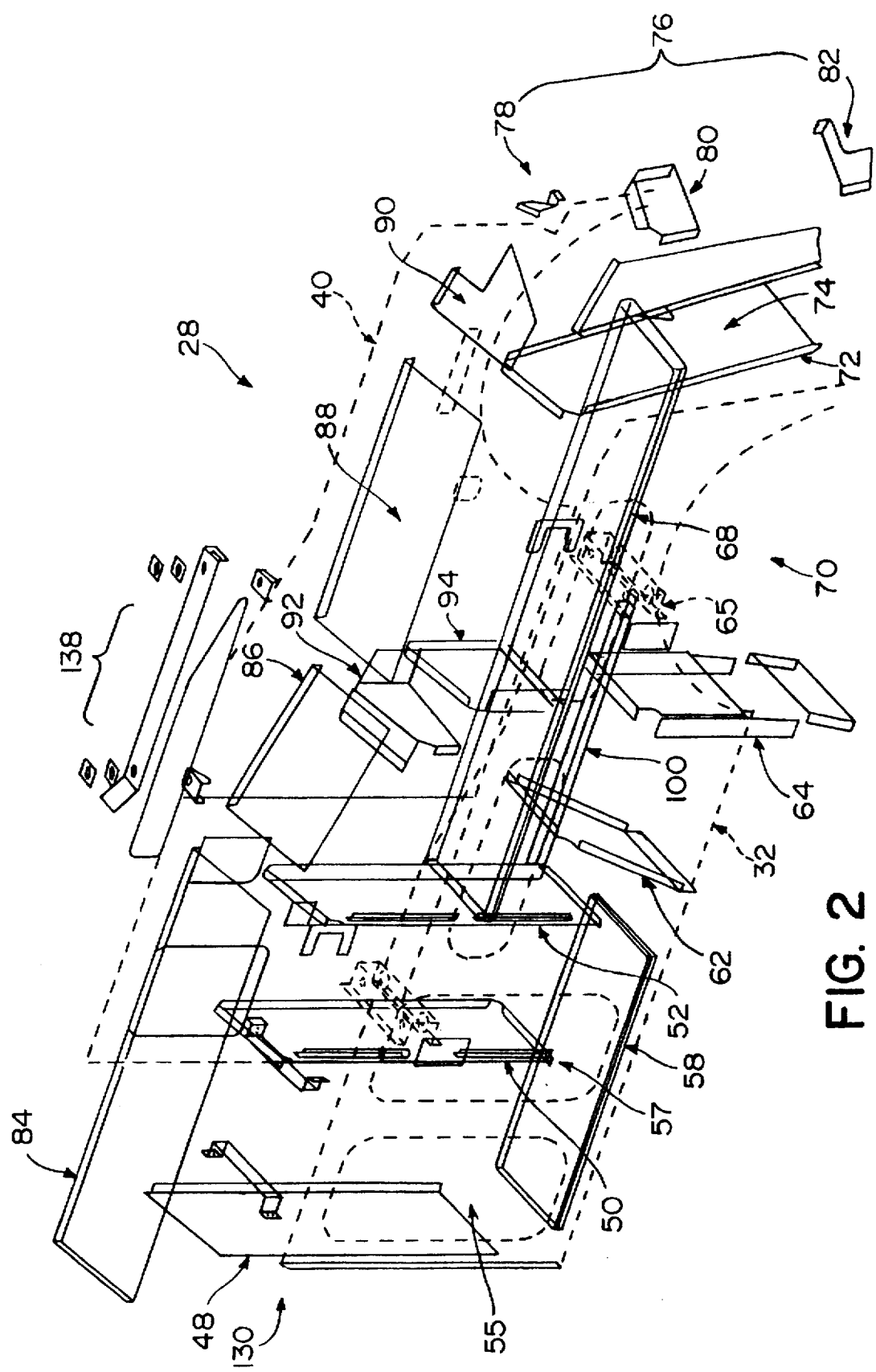
FIG. 2 is an exploded view of the preferred embodiment of a structural unit of the present invention.

Turning now to the drawings, FIG. 1 shows the tow truck of the present invention equipped with the body assembly 20 attached to a truck chassis 22, and further equipped with an under-lift assembly 23. The body assembly 20 includes a left body unit 24 and a right body unit 26. The left body unit 24 and the right body unit 26 each have a structural unit 28 as shown in FIG. 3, and a plurality of exterior panels 30 attached to the structural unit 28.

Figure 3:
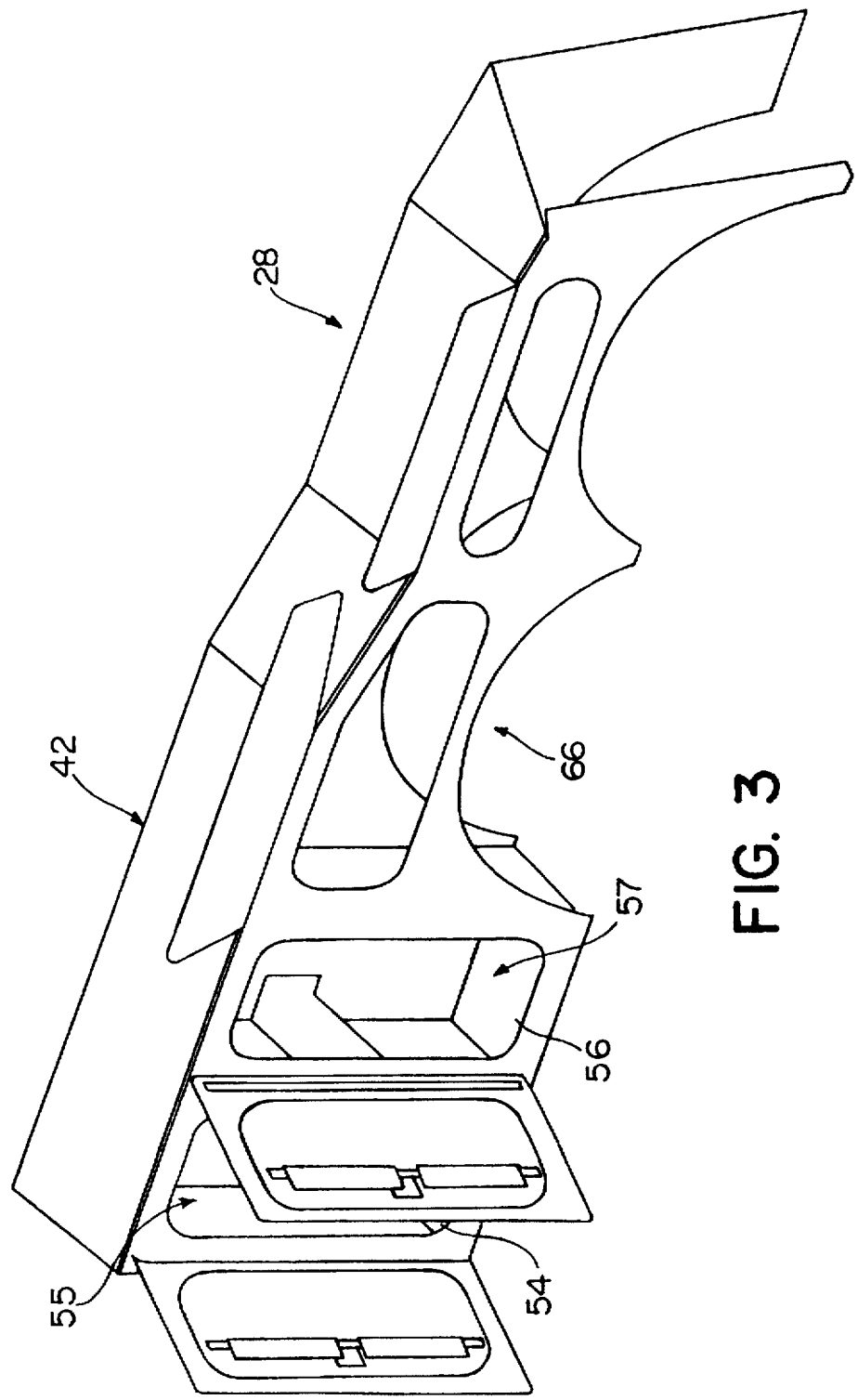
FIG. 3 is an isometric view a structural unit of the present invention.
Figure 4:
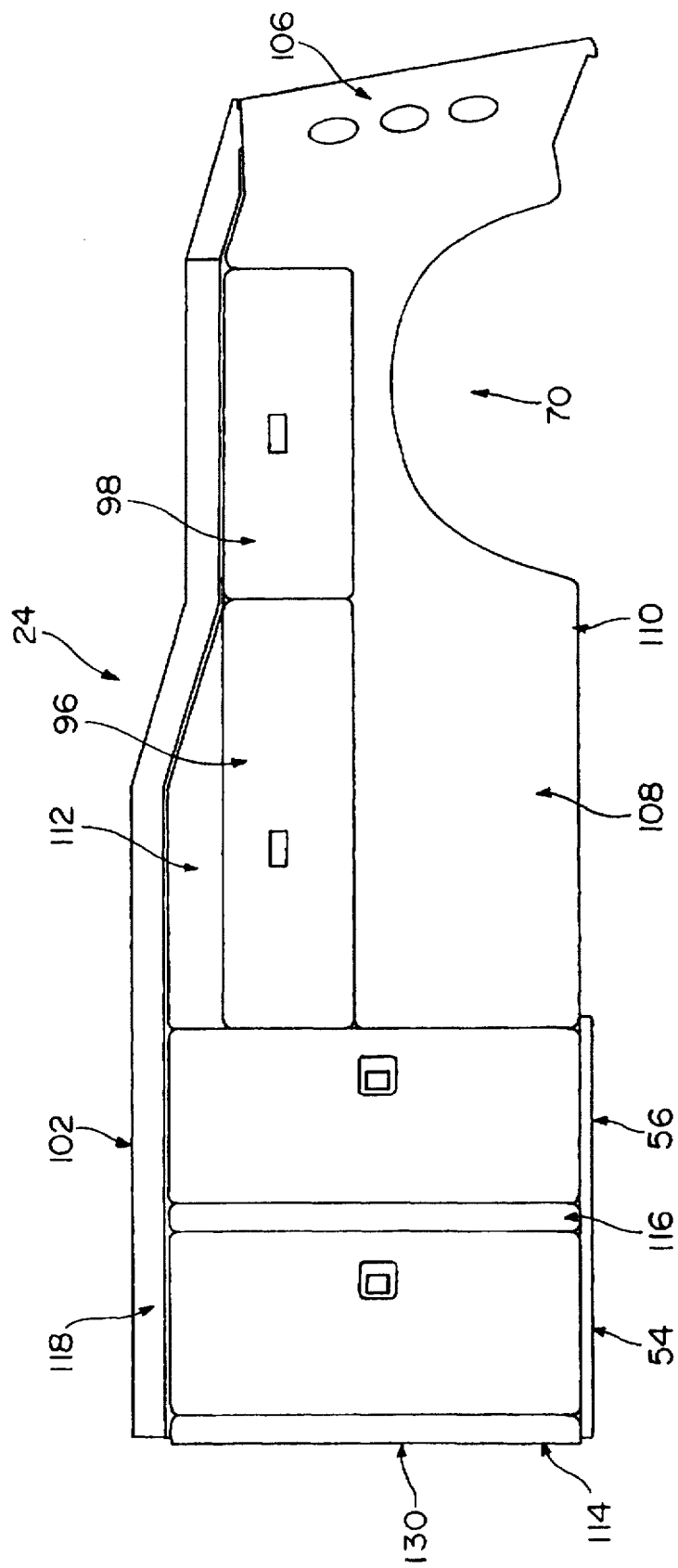
FIG. 4 is a side view of a left body unit of the present invention.
Figure 5:
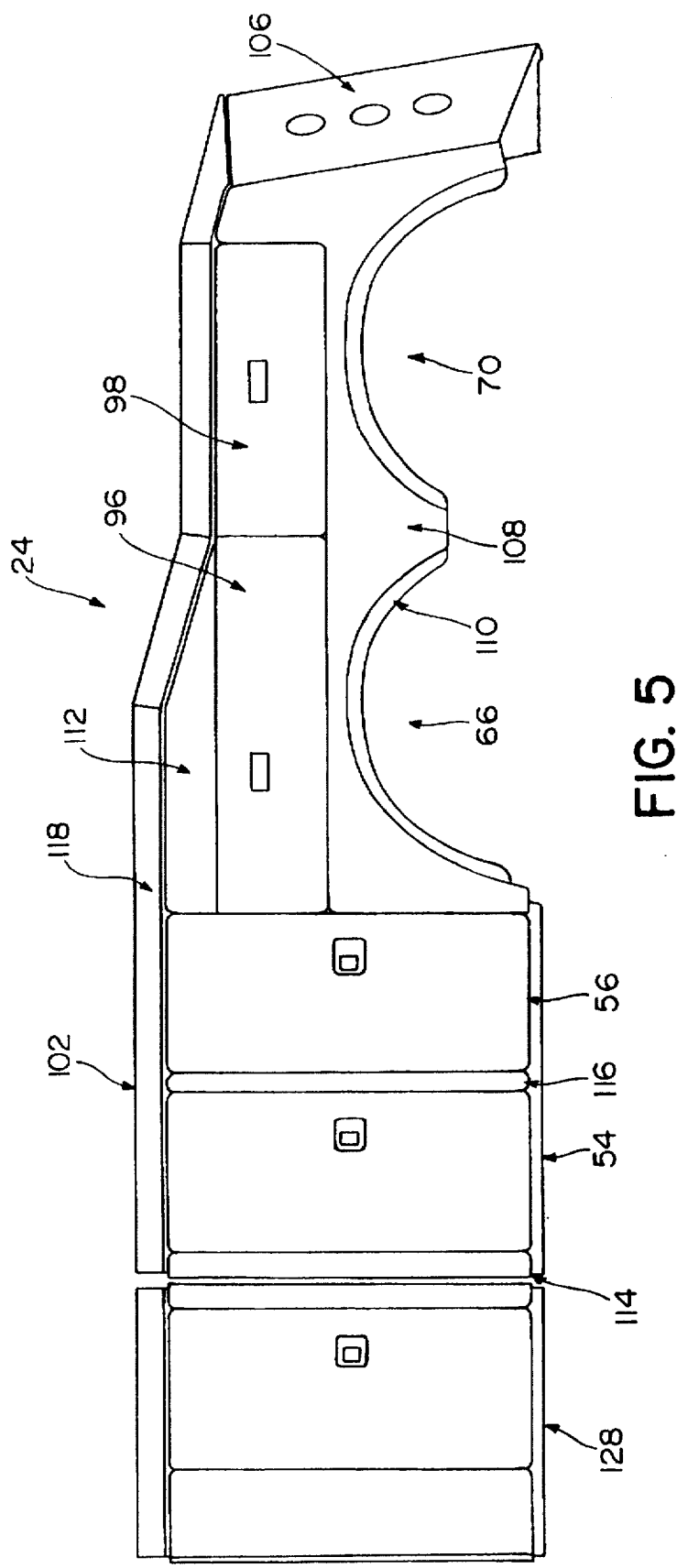
FIG. 5 is a side view of an alternative embodiment of the left body unit of the present invention.

FIGS. 3 and 4 show the preferred embodiment of the structural unit 28. The structural unit comprises a front panel 32 attached to a plurality of compartment panels 38. The plurality of compartment panels 38 are attached to a back panel 40. A top panel 42 is attached to the front panel 32 and the back panel 40. Each of the respective panels has at least one flange 44 along at least one edge.

As shown in FIGS. 3 and 4, the structural unit 28 of the preferred embodiment comprises front panel 32, back panel 40. Attached in between the front panel and the back panel are a plurality of compartment panels 38. The compartment panels 38 comprise three vertical partition panels 48, 50, 52 defining two vertical storage compartments 54, 56. A bottom partition panel 58 defines the bottom of the two vertical storage compartments 54, 56. The front panel 32 has cutouts 55, 57 to provide access to the respective storage compartments 54, 56.

A forward channel body mount 60 is attached to the middle vertical partition panel 50 for mounting the body unit 24, 26 to the truck chassis 22. First and second forward wheel well panels 62, 64 attached to front panel 32 and back panel 40 form the forward wheel well 66. A rear channel mount 65 is attached to the second forward wheel well panel 66. A horizontal center panel 68 affixed to front panel 32, back panel 40, and the first and second forward wheel well panels 62, 64, forms the top of the forward wheel well 66 and a rear wheel well 70. A rear panel 72 forms the rear surface 74 of the structural unit 28. A rear surface assembly 76 is formed by assembly of a first panel 78, a second panel 80, and a third panel 82. The top panel 42 comprises four separate panels 84, 86, 88, 90. A first, forward most, top panel 84 is disposed substantially horizontally. A second top panel 86 that is adjacent to the first top panel is disposed at an angle swept downward from the level of the first top panel 84. A third top panel 88 adjacent to the second top panel 86 is disposed substantially horizontally. A fourth top panel 90 is disposed adjacent to the third top panel 88 and is disposed at an angle swept downward from the level of the third top panel 88. A top panel support 92 is formed under the second top panel 86 to give it support. A middle panel 94 is disposed below a line formed where the second and third top panels 86, 88 meet. The middle panel 94 separates two horizontal storage compartments 96, 98. The front panel 32 has cut-outs 97, 99 to provide access to the respective storage compartments 96, 98.

The flanges 44 are formed on the respective panels by bending the respective panel or by attaching an angle element 100 to the respective panel.

In the preferred embodiment, the front panel 32, the back panel 40, the top panel 42, and the plurality of compartment panels 38, are attached by an adhesive 46 disposed on the flanges 44. A preferred adhesive suitable for use with the invention is VERSILOK brand acrylic adhesive, made by the Lord Corporation of Erie, Pennsylvania. The acrylic adhesive preferably includes glass micro-beads to ensure even clamping and bonding.

The front panel 32, the back panel 40, the top panel 42, and the plurality of compartment panels 38 are each formed from light weight rust resistant materials. The preferred light weight rust resistant materials are composite materials and aluminum.

The composite components can be constructed from resin and fiber reinforcement systems which can be manufactured in a range of processes from resin transfer molding, compression molding, hand lay-up, reaction injection molding, or chopper gun. Resins can be polyester, vinylester, epoxy, or any alternate resin that can be manufactured using the above processes. Reinforcement fibers can run the full range of glass fiber, arimids, carbon fiber or alternate fibers which when combined with resins listed above form structurally sound materials which meet the requirements of component.

FIGS. 5–8 show the body units 24, 26, with Exterior panels 30 attached to exterior surfaces of the structural unit. An exterior top panel 102 is attached to the top panel 42, an exterior front panel 104 is attached to the front panel 32 and an exterior rear panel tail-light assembly 106 attached to the rear surface 74 of the structural unit.

In a preferred embodiment the exterior front panel 104 comprises an exterior fender panel 108 with an attached exterior flare panel 110, a fixed logo panel 112, and two exterior narrow panels 114, 116. The exterior panel is formed from light weight rust resistant material. Aluminum or composite material may be used as the material of construction. Molded composite panels are the preferred embodiment.

In a preferred embodiment the exterior top panel 102, the exterior front panel 104, and the exterior rear panel taillight assembly 106, are each removably attached to provide for replacement.

In the preferred embodiment a top surface 118 of the exterior top panel 102 is slanted downwards from the back panel 40 towards the front panel 32 at approximately a 10 degree angle.

Doors 120, 122, 124, 126 are disposed in the respective front panel storage compartment cut-outs 55, 57, 97, 99. The doors 120, 122, 124, 126 are formed from lightweight rust resistant material such as aluminum or composite material. Composite material is the preferred material of construction.

A forward through compartment 127 is attached to the back panels 40 of both the left body unit 24 and the right body unit 26 opposite to the front panel cut-outs 55 for the first vertical storage compartment 54. The forward through compartment 127 connects the left body unit 24 and the right body unit 26 and provides storage for lengthy tools and towing equipment.

Figure 6:
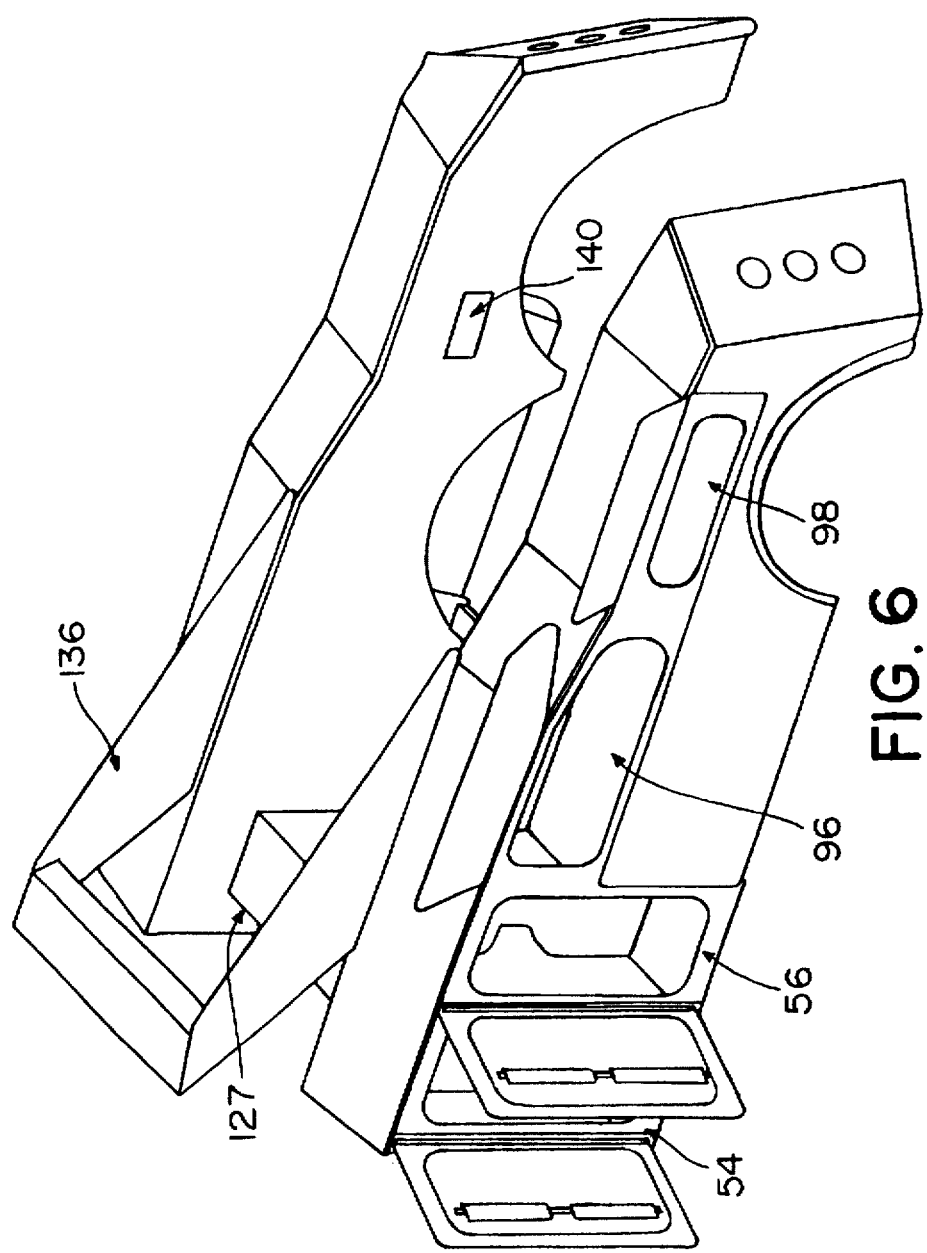
FIG. 6 is an isometric view of the body assembly of the present invention with storage compartment doors open.
Figure 7:
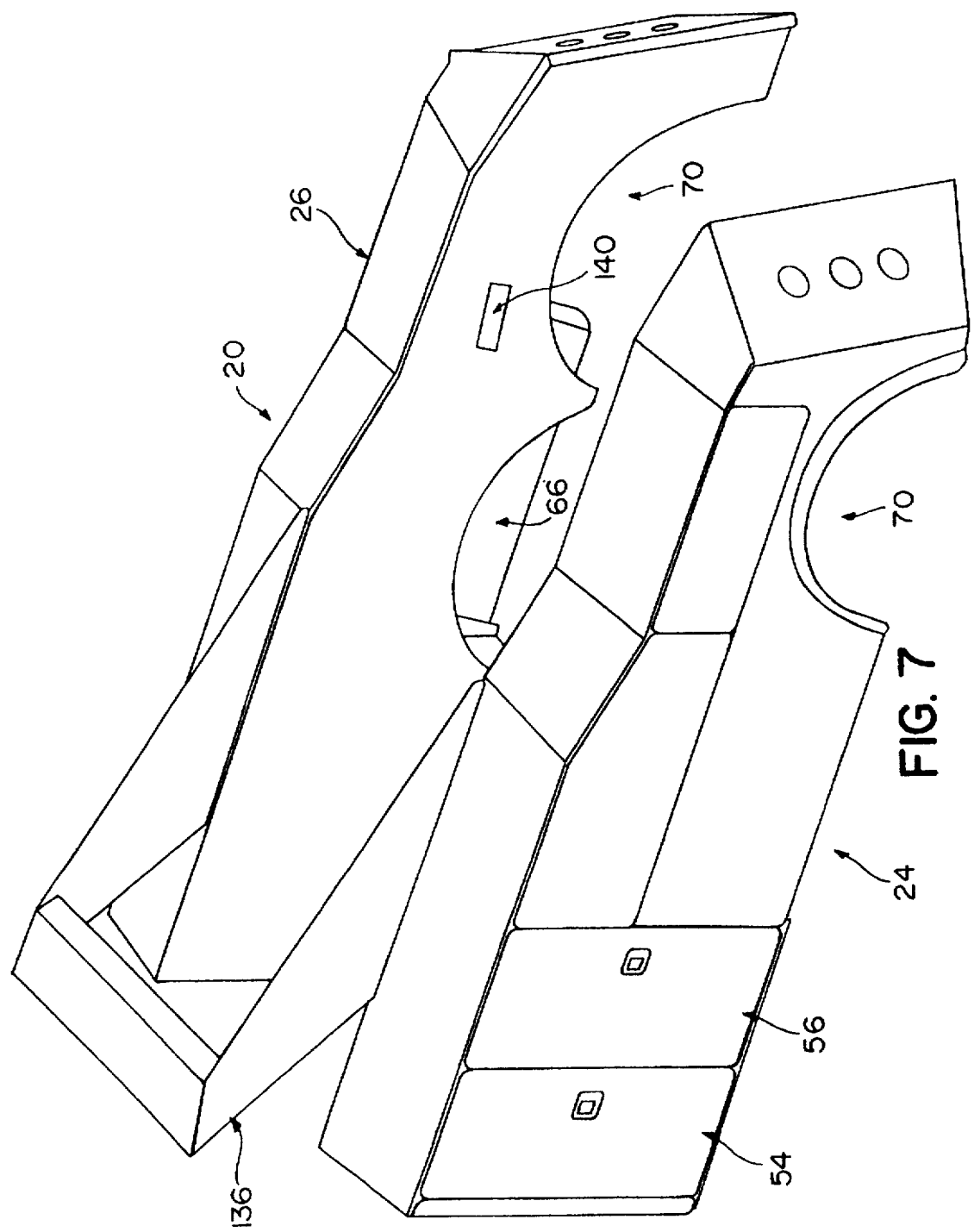
FIG. 7 is an isometric view of the body assembly of the present invention.
Figure 8:
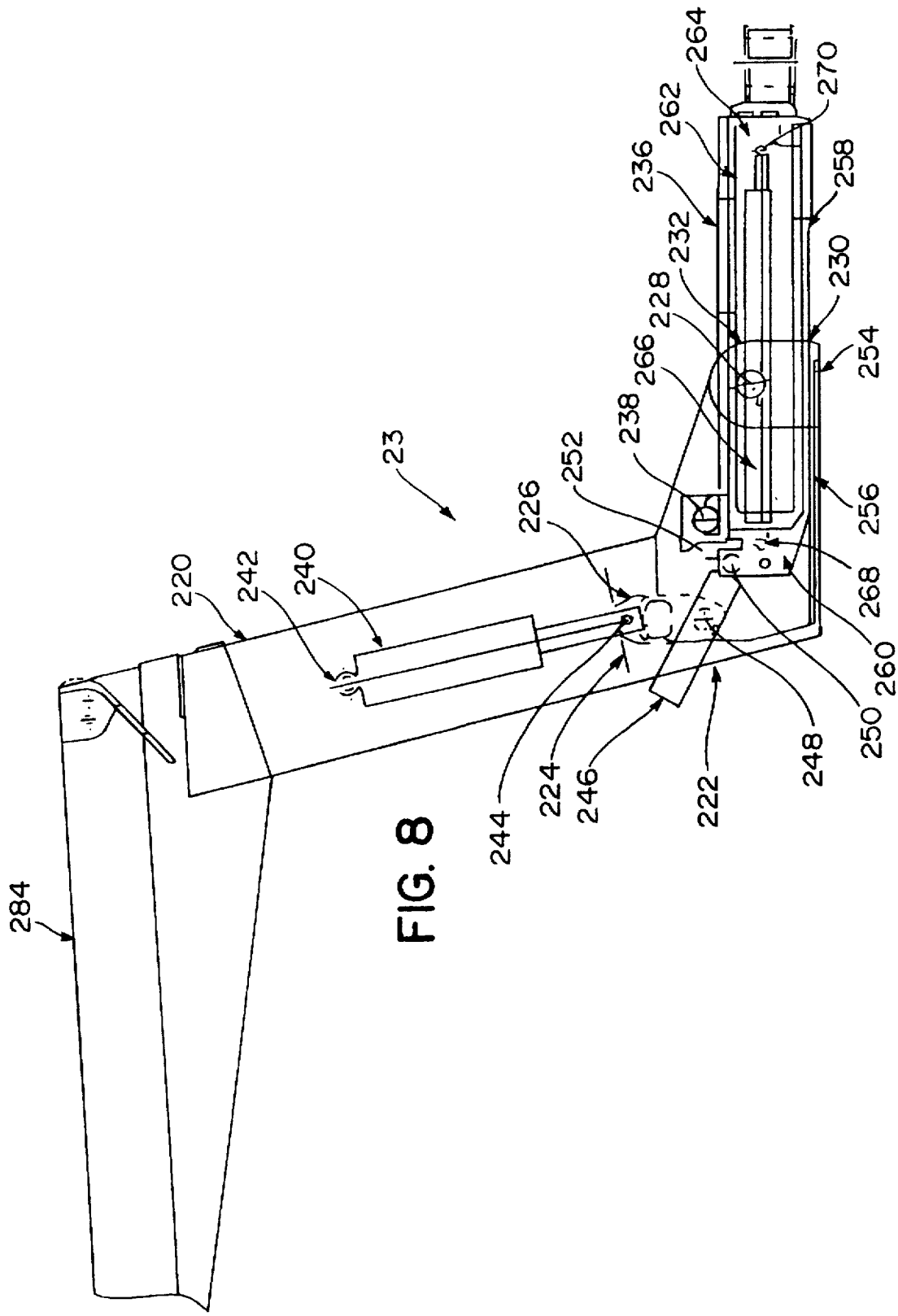
FIG. 8 is a side view of the underlift assembly of the present invention, shown in the normal operating position.

Variations of this embodiment of the invention are possible. For example, as shown in FIG. 6 an alternative embodiment of the present invention includes additional storage compartment modules 128 disposed adjacent to a forward surface 130 of the structural unit 28 in order to provide additional length to the body units 24, 26 so that body assemblies 20 can be formed in different sizes using the same body units 24, 26. This cuts down on the inventory required to outfit a variety of truck chassis types and sizes.

Depending upon the type of truck chassis the body assembly 20 is going to be attached to, single axle or tandem, the exterior front panel 104 has one wheel well cut-out 132 corresponding to the rear wheel well 70 or two wheel well cut-outs corresponding to both the forward and rear wheel wells 66, 70. This allows for the same structural unit 28 with two wheel wells 66, 70 to be used for both single and tandem axle truck chassis. In the case of a single axle truck chassis the exterior front panel 104 covers up the forward wheel well 66. A variation on the present invention includes the use of additional wheel wells to accommodate truck chassis with additional axles.

In yet another variation panel rigidity, such as of the front panel 32, back panel 40, top panel 42 and the plurality of compartment panels 38, can be enhanced by use of cores molded into the individual components. These core materials can consist of any rigid, stable, closed cell foam or alternate material compatible with the resin chosen. The cores are inserted into the molds and the resin and fiber materials are formed and cured around them to result in a structurally sound component which minimizes weight and maximizes structural integrity.

In another variation the panels can be adhesively attached using a plurality of rivets or other fasteners to align and clamp the respective panels being adhesively attached during the adhesive setting period. An alternative process uses clamp members to align and clamp the respective panels being attached.

In another alternative embodiment the exterior panels may be permanently attached through the use of adhesive.

In yet another variation the preferred embodiment includes a light pylon structure 136 for supporting a light assembly (not shown), the light pylon structure 136 attached to the left body unit 24 and to the right body unit 26 by light pylon mounting assemblies 138.

In still another variation, the back panel of each unit is may be provided with a cut-out 140 for control elements (not shown) for tow-truck equipment.

FIGS. 8–12 show an underlift assembly 23 for attachment to a tow truck. As shown in FIGS. 8–11 the underlift assembly 23 has a support arm 220 that is coupled to the towing vehicle. A base 222 is coupled at a first end 224 to the support arm 220. A boom base 226 is pivotally attached to the base 222 at a first pivot point 228. The first pivot point 228 is preferably located adjacent to a second end 230 of the base 222 that is opposite to the first end of the base 224, and adjacent to a first end 232 of the boom base 226. The boom base 226 has a first end 232 and a second end 234. The second end 234 is located nearer to the first end of the base 224 than is the first end of the boom base 232. A boom 236 is pivotally attached to the boom base 226 at a second pivot point 238 that is preferably located further from the first end of the boom base 232 than the first pivot point 228. A first actuator 240 is coupled to the support arm 220 by a pivot pin 242 and the boom base 226 by a pivot pin 244. The first actuator 240 pivots the boom base 226 with respect to the support arm 220. A second actuator 246 is coupled to the boom base 226 by pivot pin 248 and the boom 236 by pivot pin 250. The second actuator 246 pivots the boom 236 with respect to the boom base 226. Vehicle engaging attachments are connected to a distal end of the boom which may engage the vehicle's frame or wheels. A suitable wheel engaging attachment is illustrated in U.S. Pat. Nos. 4,741,661, and 4,797,057, which are incorporated herein by reference.

In the preferred embodiment a first stop 252 is attached to the boom base 226. The first stop 252 is preferably located between the second pivot point 238 and the second end of the boom base 234. A second stop 254 is attached to the boom base 226. The second stop 254 is preferably located below the first pivot point 228. The first and second stops 252, 254 restrict the pivot range of the boom 236 with respect to the boom base 226. The first stop 252 and the second stop 254 restrict the boom 236 from pivoting below a line formed by a lower edge of the boom base 256.

Figure 9:
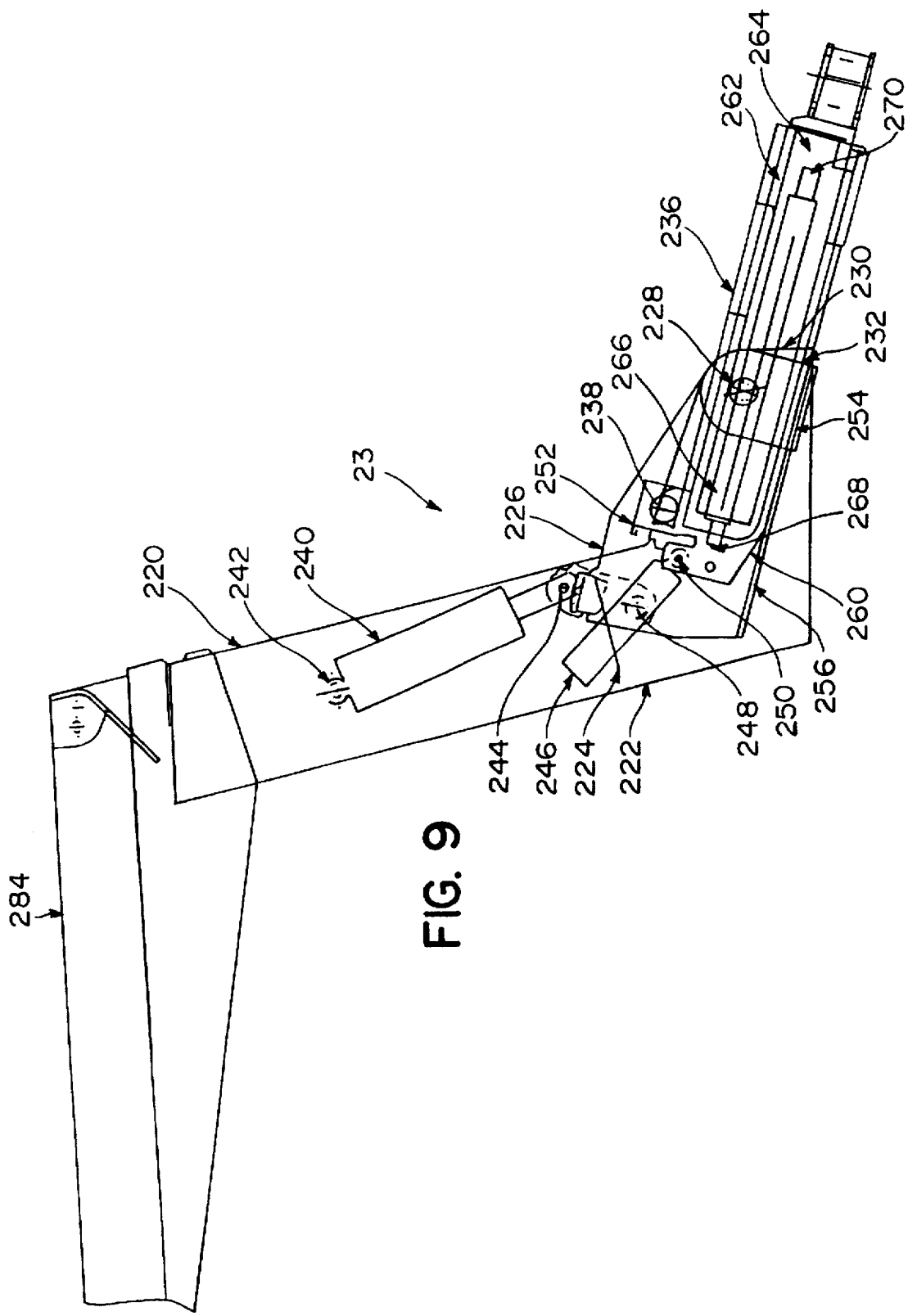
FIG. 9 is a side view of the underlift assembly of the present invention, shown with the boom base pivoted at about a 15 degree decline.
Figure 10:
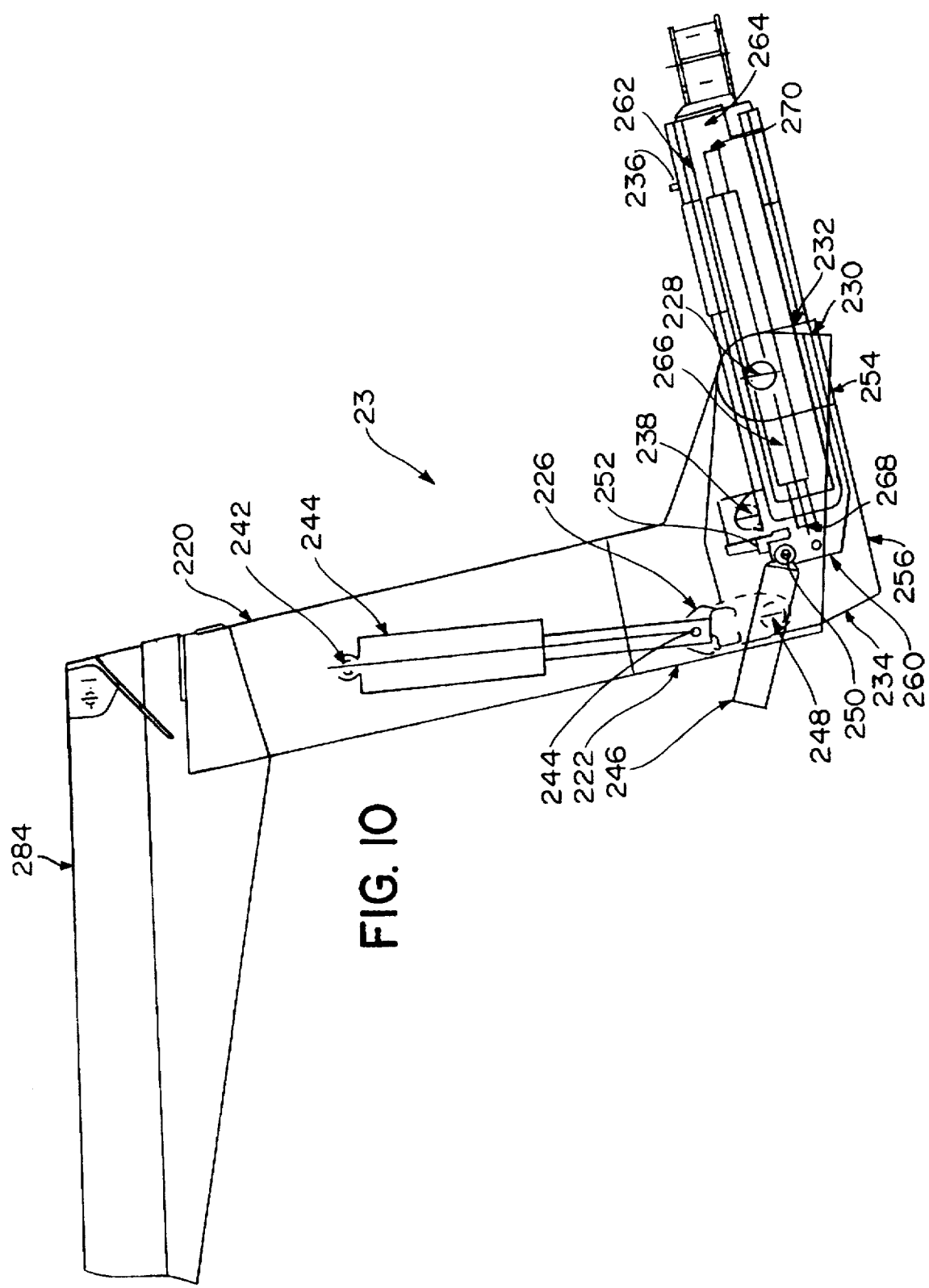
FIG. 10 is a side view of the underlift assembly of the present invention, shown with the boom pivoted at about a 15 degree incline.
Figure 11:
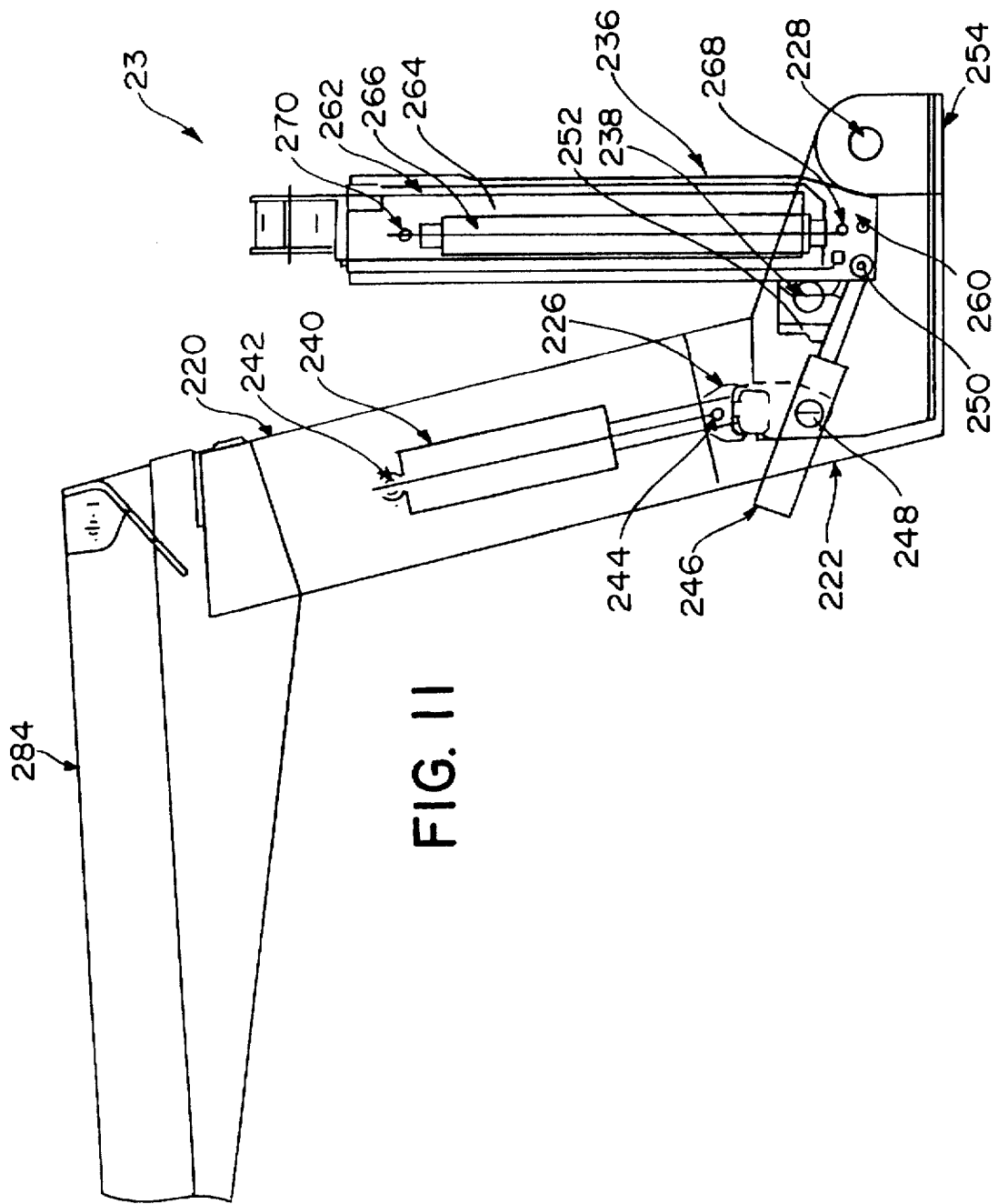
FIG. 11 is a side view of the underlift assembly of the present invention, shown with the boom pivoted into a folded position.

As shown in FIGS. 9 and 10, the first actuator 240 is used to position the boom 236 during lifting operation. In order to lift the vehicle to be lifted the first actuator 240 is extended to pivot the boom base 226 downward around the first pivot point 228. The first and second stops 252, 254 restrain the boom 236 from pivoting downward, forcing the boom 236 to be pivoted upward. The boom base 226 pivots, with respect to the base 222, with a range of motion of approximately about plus or minus 15 degrees from horizontal. As shown in FIG. 11 the second actuator 246 is used to position the boom 236 into a folded rest position. In order to fold the boom 236 into a rest position the second actuator 246 is extended which pivots the boom 236 around the second pivot point 238. The boom 236 pivots, with respect to the boom base 226, from a position where a lower edge of the boom 258 is substantially level with the lower edge of the boom base 256 upward to a position where the boom 236 is substantially parallel to the support arm 220.

In the preferred embodiment, the boom 236 comprises a first boom stage 260, a second boom stage 262, and a third boom stage 264. The three boom stages are telescopically related. The first boom stage 260 is pivotally attached to the boom base 226 at the second pivot point 238. The second actuator 246 is coupled to the first boom stage 260. A third actuator 266 is coupled to the first boom stage 260 by a first pivot pin 268, and the third boom stage 264 by a second pivot pin 270. The operation of the third actuator 266 telescopes the three boom stages. The first, second, and third actuators 240, 246, 266 are preferably hydraulic actuators.

Figure 12:
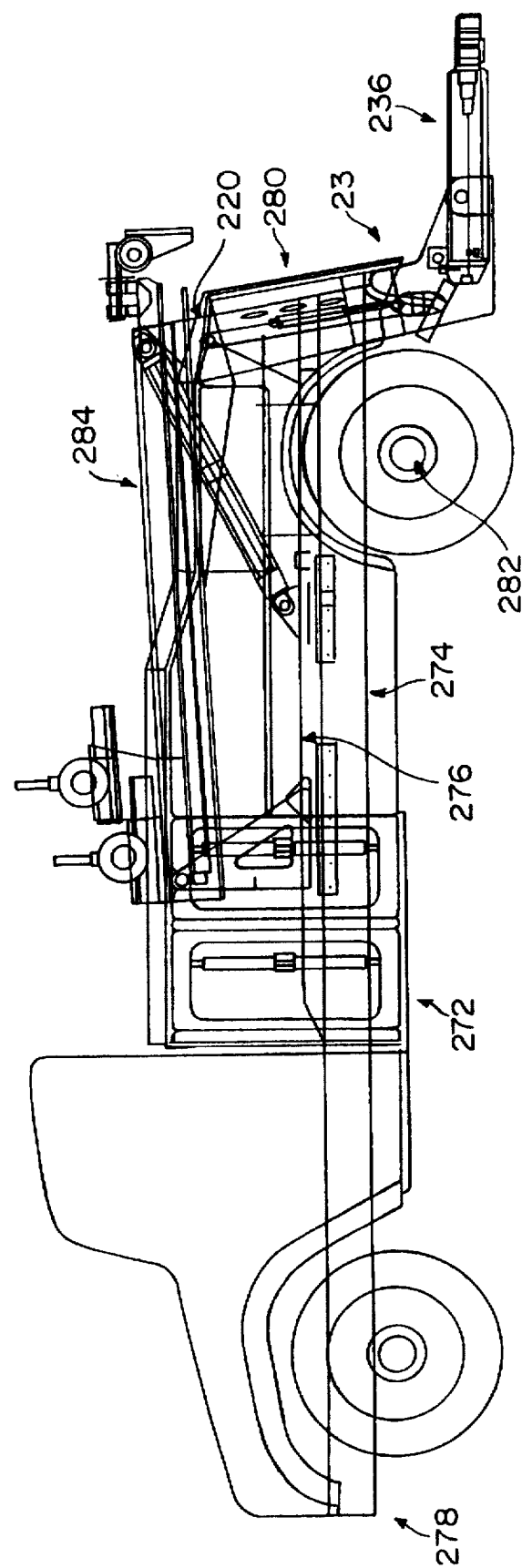
FIG. 12 is a side view of the underlift assembly of the present invention shown in an operating position mounted on a heavy duty truck.

Variations on the above embodiment are possible. For example, as illustrated in FIG. 12, the underlift assembly 23 of the present invention is shown in normal operating position coupled to a tow truck chassis 272. The tow truck chassis includes spaced frame members 274 and a deck 276 above said frame members. The tow truck chassis has a forward end 278 and a rearward end 280 including a rear axle 282. Coupled to the tow truck chassis 272 is a lifting boom 284 and the underlift assembly 23 as shown is coupled to the lifting boom 284.

In yet another variation and merely by way of example, other types of actuators, such as screw motor driven screw actuators may be utilized as the first, second, and third actuators of the invention.

The invention described above provides a number of significant advantages. The improved underlift assembly provides improved ground clearance due to the short range of extension of the first actuator. The first actuator is only responsible for the lifting operation so can be designed specifically for the operating load. The second actuator which is not directed towards the ground provides the additional extension needed to perform the folding function. The improved underlift therefore has the advantages of improved ground clearance and load capability along with the benefit of a boom that can be folded into a rest position for storage.

FIGS. 13–18 show the improved lifting boom assembly of the instant invention. The improved lifting boom assembly of the present invention comprises a first lifting hydraulic actuator 290 disposed on a first side of a lifting boom 284 and a second lifting hydraulic actuator 292 disposed on a second side of the lifting boom. Each of the first and second lifting hydraulic actuators 290, 292 are coupled to the tow truck chassis 272 by a first coupling point 294, and to the lifting boom 284 by a second coupling point 295. The first coupling point 294, of the each first and second lifting hydraulic actuators 290, 292, is disposed a greater distance from a center vertical plane 296, that is formed through a length-wise center line than is the second coupling point 295. The first and second lifting hydraulic actuators 290, 292 are each coupled to the lifting boom 284 and the tow truck chassis 272 so that a line 298 generated through the length-wise center of the each first and second lifting hydraulic actuators 290, 292 is not parallel with the center vertical plane 296 formed through a length-wise center line of the lifting boom.

Figure 13:
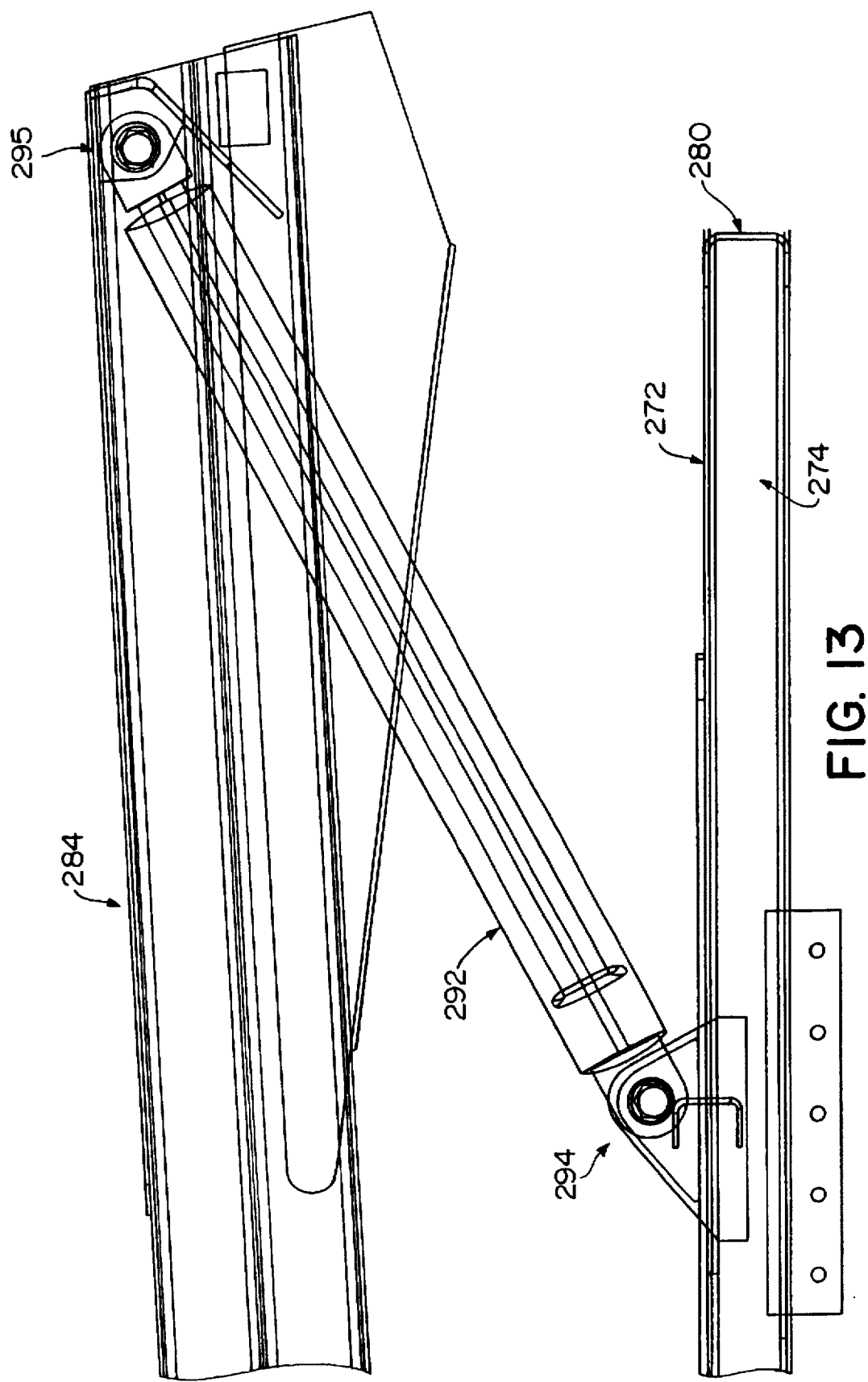
FIG. 13 is a side view of the lifting boom assembly of the present invention shown disposed at a 3 degree angle to horizontal.
Figure 14:
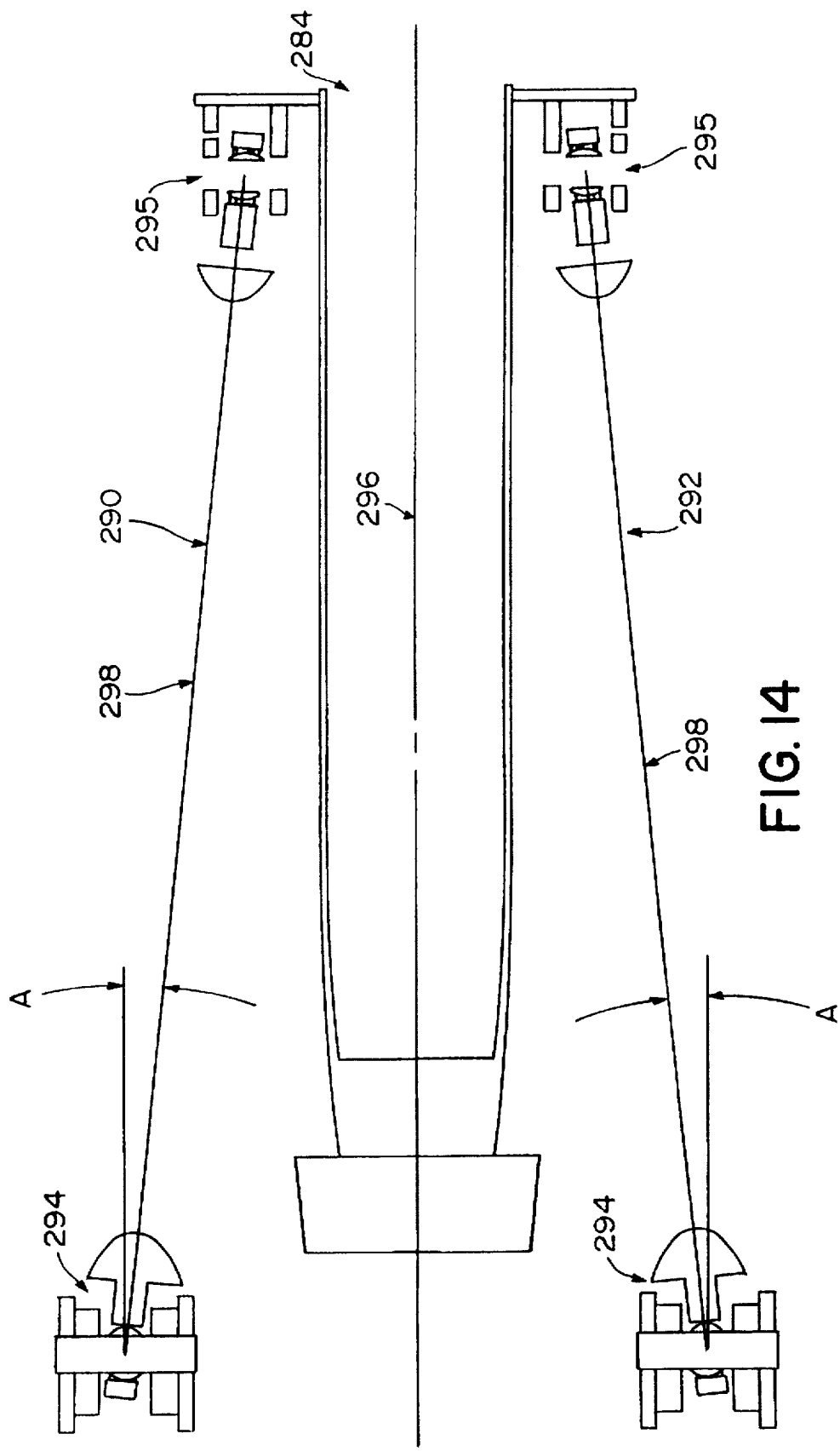
FIG. 14 is a top view of the lifting boom assembly of FIG. 13.
Figure 15:
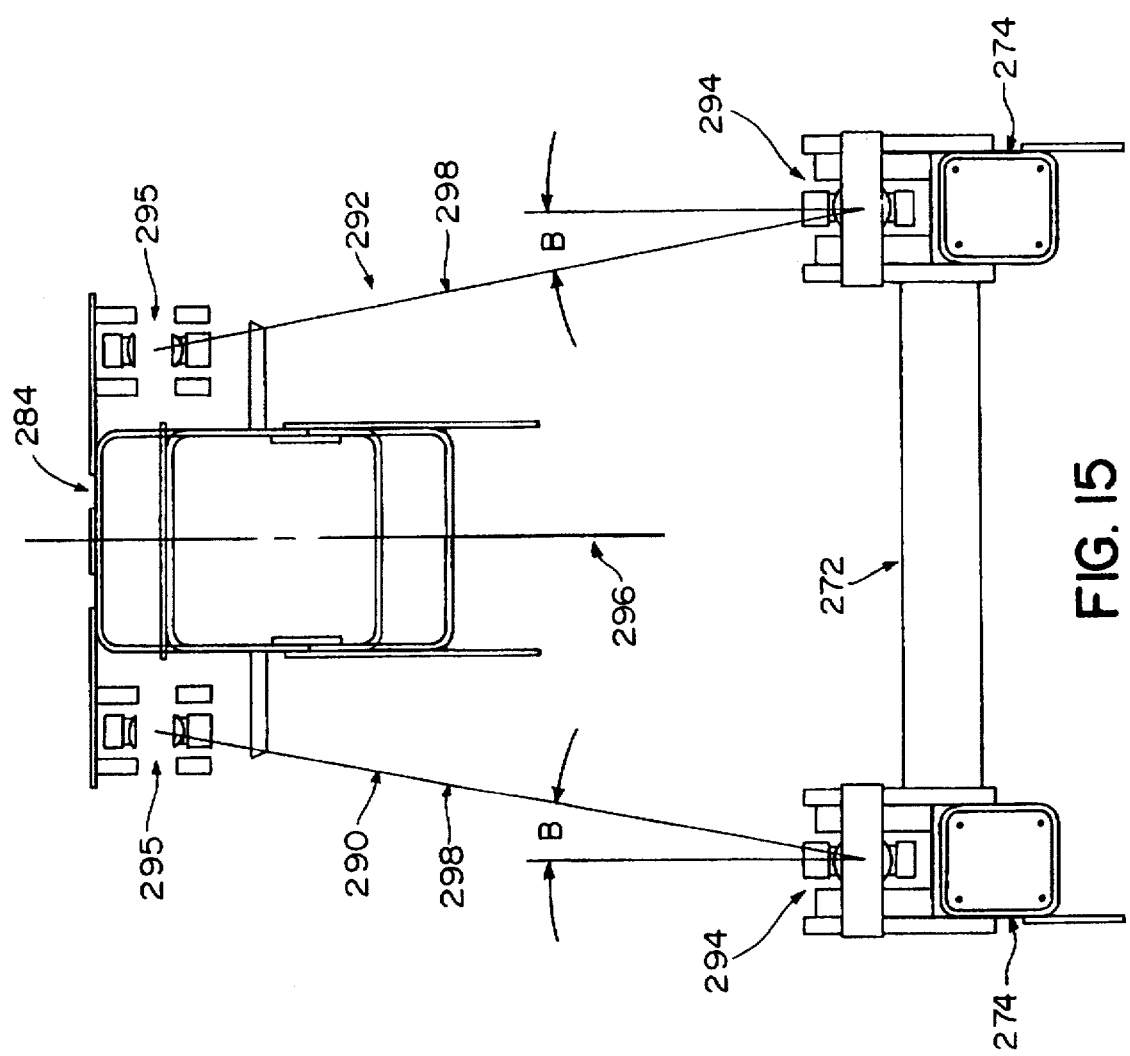
FIG. 15 is a rear view of the lifting boom assembly of FIG. 13.

FIGS. 13–15 show the preferred embodiment of the lifting boom assembly of the present invention when it is disposed at about a 3 degree angle from horizontal. FIG. 14 shows a top view of the lifting boom assembly when disposed at about a 3 degree angle with the lifting hydraulic actuators shown in phantom by the center lines 298. In the each first and second lifting hydraulic actuators the preferred angle A between 1) a vertical plane that intersects the line 298 generated by the length-wise center of the lifting hydraulic actuator and 2) the center vertical plane 296 formed through a length-wise center line of the lifting boom is in the range of about 3 to 8 degrees and preferably about 5.77 degrees.

FIG. 15 shows a rear view of the lifting boom assembly of the present invention when it is disposed at about a 3 degree angle. In each of the first and second lifting hydraulic actuators the preferred angle B between 1) a plane formed by the intersection of a) the line 298 generated by the length-wise center of the lifting hydraulic actuator and b) a line that is generated by the intersection of a horizontal plane and a vertical plane and 2) the center vertical plane 296 formed through a length-wise center line of the lifting boom is in the range of about 7 to 14 degrees and preferably about 10.84 degrees.

Figure 16:
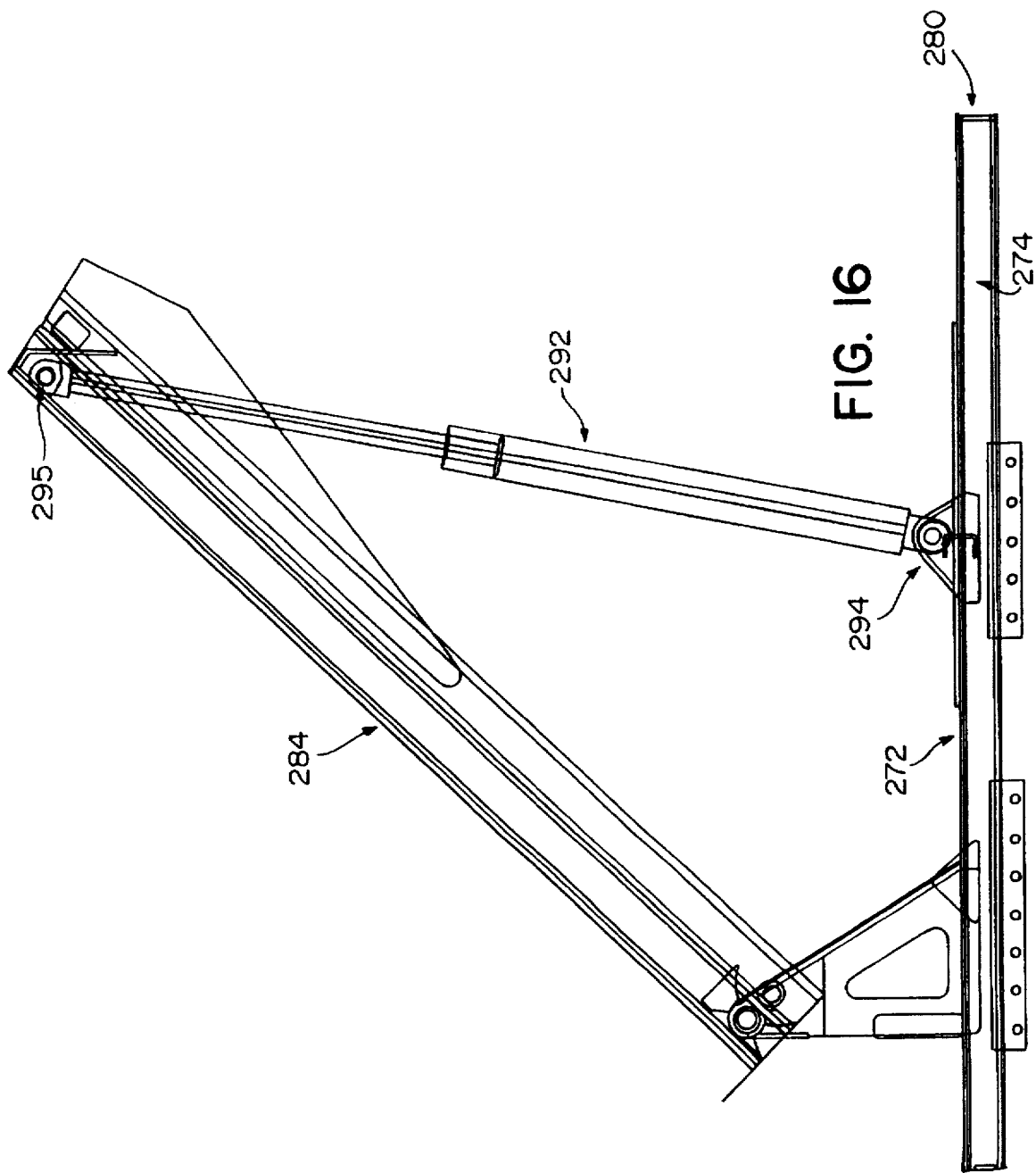
FIG. 16 is a side view of the lifting boom assembly of the present invention shown disposed at a 45 degree angle to horizontal.
Figure 17:
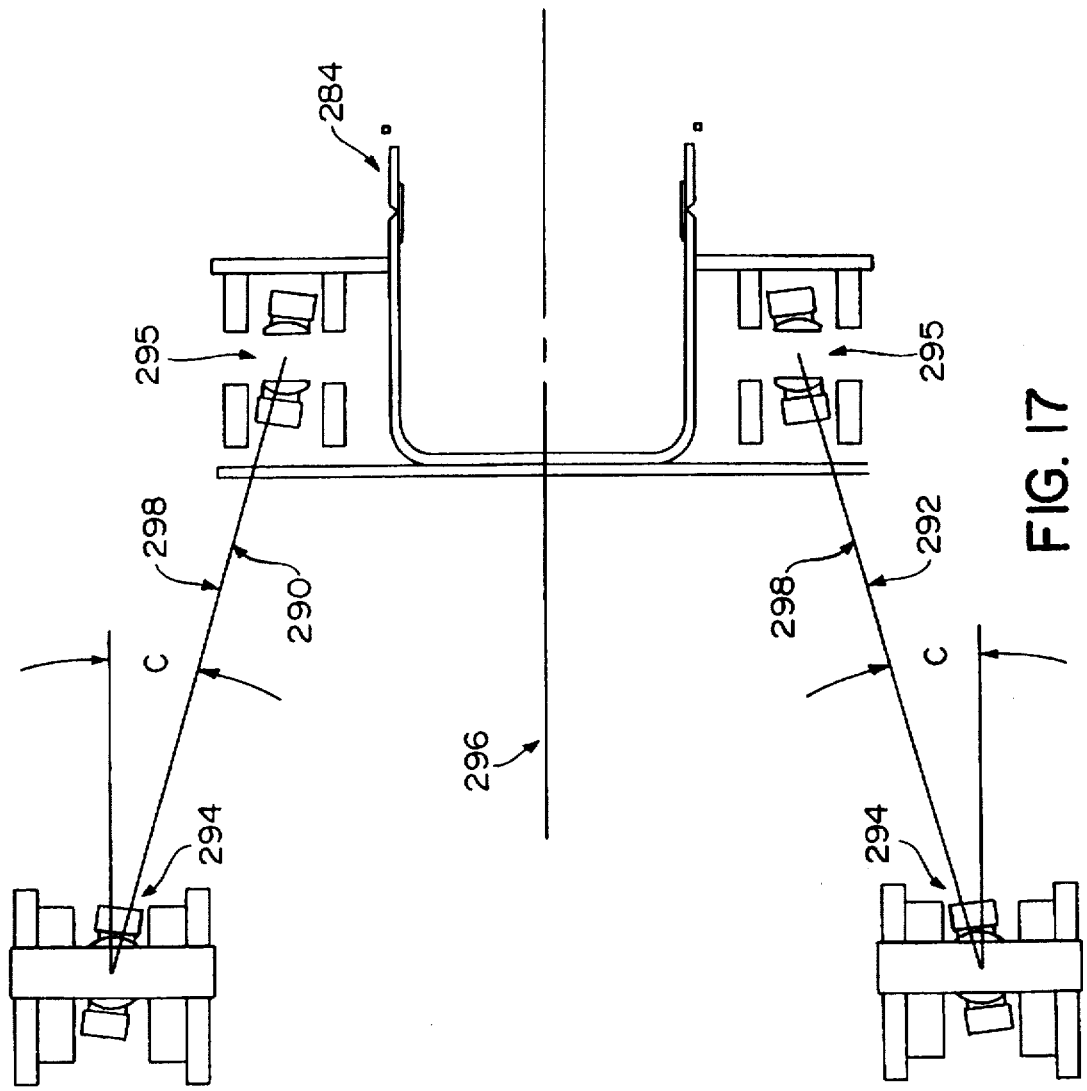
FIG. 17 is a top view of the lifting boom assembly of FIG. 16.
Figure 18:
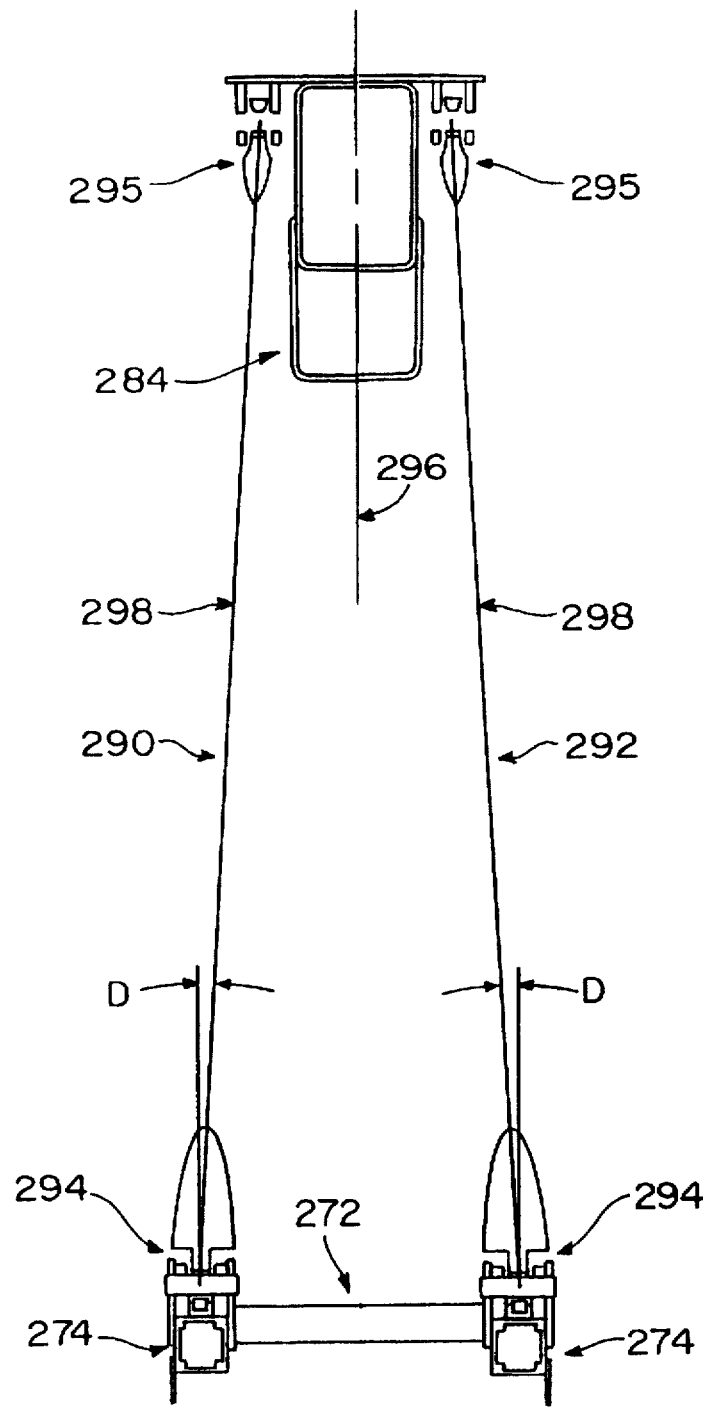
FIG. 18 is a rear view of the lifting boom assembly of FIG. 16.

FIGS. 16–18 show the preferred embodiment of the lifting boom assembly of the present invention when it is disposed at about a 45 degree angle from horizontal. FIG. 17 shows a top view of the lifting boom when disposed at about a 45 degree angle with the lifting hydraulic actuators shown in phantom by the center lines 298. In the each first and second lifting hydraulic actuators the preferred angle C between 1) a vertical plane that intersects the line 298 generated by the length-wise center of the lifting hydraulic actuator and 2) the center vertical plane 296 formed through a length-wise center line of the lifting boom is in the range of about 12 to 19 degrees and preferably about 15.55 degrees.

FIG. 18 shows a rear view of the lifting boom assembly of the present invention when it is disposed at about a 45 degree angle. In each of the first and second lifting hydraulic actuators the preferred angle D between 1) a plane formed by the intersection of a) the line 298 generated by the length-wise center of the lifting hydraulic actuator and b) a line that is generated by the intersection of a horizontal plane and a vertical plane and 2) the center vertical plane 296 formed through a length-wise center line of the lifting boom is in the range of about 1 to 5 degrees and preferably about 3.05 degrees.

The improved lifting boom assembly therefore provides the advantage of improved stability because the lifting hydraulic actuators are angled inward towards the lifting boom at their upper ends. The force vectors of each of the first and second lifting hydraulic actuators as a result of the angled placement has a vertical component that provides the lift and a horizontal component that opposes the opposite lifting hydraulic actuator restricting the lifting boom from having any unwanted horizontal movement.

Of course it should be understood that a wide range of changes and modifications can be made to the present invention as described above. It is therefore intended that the foregoing detailed description be regarded as illustrative rather than limiting, and that it be understood that it is the following claims, including all equivalents, which are intended to define the scope of the this invention.

We claim:

1. A tow truck for lifting a part of a vehicle and towing the vehicle comprising:

a tow truck chassis including spaced frame members and a deck above said frame members, and said tow truck chassis having a forward end and a rearward end including a rear axle;

a lifting boom assembly coupled to the tow truck chassis; and an underlift assembly coupled to the lifting boom, wherein said underlift assembly comprises:

a support arm coupled to the lifting boom;

a base coupled to an end of the support arm;

a boom base pivotally attached to the base at a first pivot point;

a boom pivotally attached to the boom base at a second pivot point;

a first actuator coupled to the support arm and the boom base, wherein the operation of the first actuator pivots the boom base with respect to the support arm;

a second actuator coupled to the boom base and the boom, wherein the operation of the second actuator pivots the boom with respect to the boom base; and attachments coupled to the boom for engaging a vehicle for lifting a part thereof.

2. The tow truck of claim 1, wherein said lifting boom assembly further comprises:

a first lifting hydraulic actuator disposed on a first side of the lifting boom and a second lifting hydraulic actuator disposed on a second side of the lifting boom; wherein each of the first and second lifting hydraulic actuators coupled to the tow truck chassis at a first coupling point, and coupled to the lifting boom at a second coupling point; and the first coupling point of the each first and second lifting hydraulic actuators disposed a greater distance from a center vertical plane that is formed through a length-wise center line than the second coupling point.

3. The tow truck of claim 2 further wherein:

the each first and second lifting hydraulic actuators the form an angle A between 1) a vertical plane that intersects the line generated by the length-wise center of the lifting hydraulic actuator and 2) the center vertical plane formed through a length-wise center line of the lifting boom is in the range of about 3 to 8 degrees;

when the lifting boom is disposed at a 3 degree angle from horizontal.

4. The tow truck of claim 3 further wherein:

the angle A is about 5.77 degrees.

5. The tow truck of claim 2 further wherein:

the each first and second lifting hydraulic actuators form an angle B between 1) a plane formed by the intersection of a) the line generated by the length-wise center of the lifting hydraulic actuator and b) a line that is generated by the intersection of a horizontal plane and a vertical plane and 2) the center vertical plane formed through a length-wise center line of the lifting boom is in the range of about 7 to 14 degrees;

when the lifting boom is disposed at a three degree angle from horizontal.

6. The tow truck of claim 5 further wherein:

the angle B is about 10.84 degrees.

7. The tow truck of claim 2 further wherein:

the each first and second lifting hydraulic actuators the form an angle C between 1) a vertical plane that intersects the line generated by the length-wise center of the lifting hydraulic actuator and 2) the center vertical plane formed through a length-wise center line of the lifting boom is in the range of about 12 to 19 degrees;

when the lifting boom is disposed at a forty five degree angle from horizontal.

8. The tow truck of claim 7 further wherein:

the angle C is about 15.55 degrees.

9. The tow truck of claim 2 further wherein:

the each first and second lifting hydraulic actuators form an angle D between 1) a plane formed by the intersection of a) the line generated by the length-wise center of the lifting hydraulic actuator and b) a line that is generated by the intersection of a horizontal plane and a vertical plane and 2) the center vertical plane formed through a length-wise center line of the lifting boom is in the range of about 1 to 5 degrees;

when the lifting boom is disposed at a forty five degree angle from horizontal.

10. The tow truck of claim 9 further wherein:

the angle B is about 3.05 degrees.

11. The tow truck of claim 1 further comprising:

the boom restrained by a first stop and a second stop from pivoting below a line formed by a lower edge of the boom base.

12. A tow truck for lifting a part of a vehicle and towing the vehicle comprising:

a tow truck chassis including spaced frame members and a deck above said frame members, and said tow truck chassis having a forward end and a rearward end including a rear axle; and a body assembly comprising:

a left body unit and a right body unit; wherein each said body unit comprising a structural unit, and an exterior panel attached to the structural unit; the structural unit comprising:

a front panel with at least one flange formed on at least one edge, the front panel attached to a plurality of compartment panels, each said plurality of compartment panels having at least one flange formed on at least one edge, the plurality of compartment panels attached to a back panel with at least one flange formed on at least one edge; and a top panel with at least one flange formed on at least one edge attached to the front panel and attached to the back panel; wherein the front panel, the back panel, the top panel, and the plurality of compartment panels, are attached by adhesive disposed on the each at least one flanges, and form a structural unit having at least one compartment; and a support arm coupled to the truck chassis;

a base coupled to an end of the support arm;

a boom base pivotally attached to the base at a first pivot point;

a boom pivotally attached to the boom base at a second pivot point;

a first actuator coupled to the support arm and the boom base, wherein the operation of the first actuator pivots the boom base with respect to the support arm;

a second actuator coupled to the boom base and the boom, wherein the operation of the second actuator pivots the boom with respect to the boom base;

attachments coupled to the boom for engaging a vehicle for lifting a part thereof.

13. A tow truck as claimed in claim 12 wherein:

the adhesive comprising an acrylic adhesive.

14. A tow truck as claimed in claim 13 wherein:

the acrylic adhesive further comprises glass micro-beads.

15. A tow truck as claimed in claim 13 wherein:

the light weight rust resistant material is aluminum.

16. A tow truck as claimed in claim 12 wherein:

the front panel, the back panel, the top panel, and the plurality of compartment panels, are each formed from light weight rust resistant material.

17. A tow truck as claimed in claim 12 wherein:

the exterior panel is formed from lightweight rust resistant material.

18. A tow truck as claimed in claim 17 wherein:

the lightweight rust resistant material is aluminum.

19. A tow truck as claimed in claim 17 wherein:

the lightweight rust resistant material is composite.

20. A tow truck as claimed in claim 12 wherein:

the exterior panel comprising, an exterior top panel attached to the top panel; and an exterior front panel attached to the front panel; and an exterior rear panel tail-light assembly attached to a rear surface of the structural unit.

21. A tow truck as claimed in claim 20 wherein:

the exterior top panel, the exterior front panel, and the exterior rear panel taillight assembly, are each removably attached to provide for replacement.

22. A tow truck for lifting a part of a vehicle and towing the vehicle comprising:

a tow truck chassis including spaced frame members and a deck above said frame members, and said tow truck chassis having a forward end and a rearward end including a rear axle; and a body assembly comprising:
- a left body unit and a right body unit; wherein each said body unit comprising a structural unit, and an exterior panel attached to the structural unit;
- the structural unit comprising:
  - a front panel with at least one flange formed on at least one edge, the front panel attached to;
  - a plurality of compartment panels, each said plurality of compartment panels with at least one flange formed on at least one edge, the plurality of compartment panels attached to;
  - a back panel having at least one flange formed on at least one edge; and
  - a top panel having at least one flange formed on at least one edge attached to the front panel and attached to the back panel; wherein
    - the front panel, the back panel, the top panel, and the plurality of compartment panels, are attached by adhesive disposed on the each at least one flanges; and
    - the front panel, the back panel, the top panel, and the plurality of compartment panels form a structural unit having at least one storage compartment;

the at least one exterior panel comprising,
- an exterior panel top attached to the top panel; and
- an exterior front panel attached to the front panel; and
- an exterior rear panel taillight assembly attached to a rear surface of the structural unit; and a lifting boom assembly coupled to the tow truck chassis comprising;
- a first lifting hydraulic actuator disposed on a first side of the lifting boom and a second lifting hydraulic actuator disposed on a second side of the lifting boom; wherein
  - each of the first and second lifting hydraulic actuators coupled to the tow truck chassis at a first coupling point, and coupled to the lifting boom at a second coupling point;
  - the first coupling point of the each first and second lifting hydraulic actuators disposed a greater distance from a center vertical plane that is formed through a length-wise center line than the second coupling point; and
- a support arm coupled to the lifting boom;
- a base coupled to an end of the support arm;
- a boom base pivotally attached to the base at a first pivot point;
- a boom pivotally attached to the boom base at a second pivot point;
- a first actuator coupled to the support arm and the boom base, wherein the operation of the first actuator pivots the boom base with respect to the support arm;
- a second actuator coupled to the boom base and the boom, wherein the operation of the second actuator pivots the boom with respect to the boom base;
- attachments coupled to the boom for engaging a vehicle for lifting a part thereof.

23. The tow truck claim 22 wherein:

the front panel, the back panel, the top panel, and the plurality of compartment panels comprising lightweight rust resistant material; and the exterior panel top, the exterior front panel, and the exterior rear panel taillight assembly comprising lightweight rust resistant material.

24. The body assembly of claim 22 wherein:

the front panel, the back panel, the top panel, and at least one compartment panels comprising aluminum; and the exterior panel top, the exterior front panel, and the exterior rear panel taillight assembly comprising composite material.

25. The body assembly of claim 22 wherein:

the adhesive comprises acrylic adhesive that incorporates glass micro-beads.

* * * * *